Jan. 11, 1938. C. F. LAUENSTEIN ET AL 2,105,048
COMPOSITE ARTICLE
Filed June 28, 1935
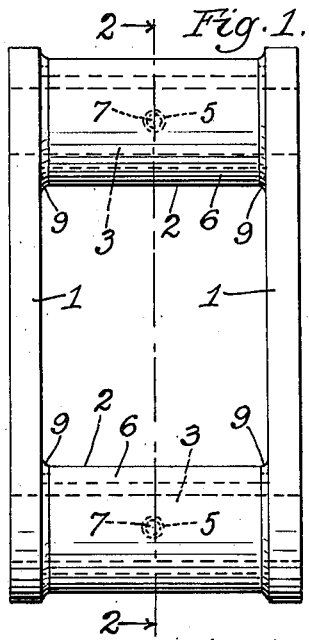
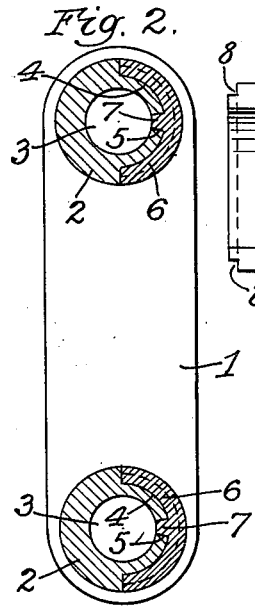
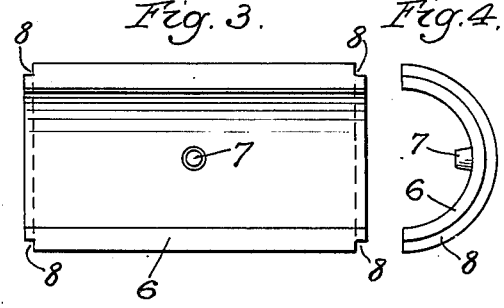
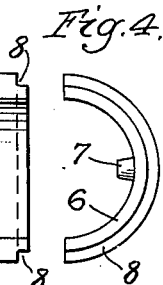
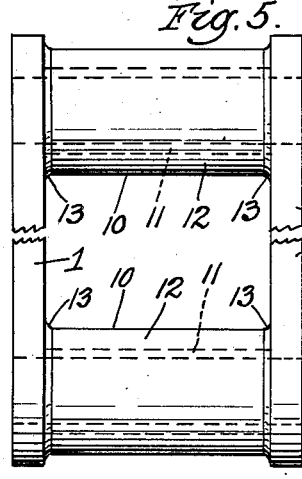
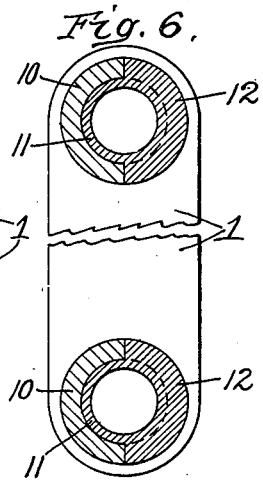
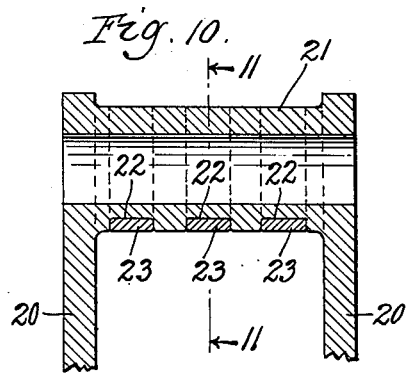
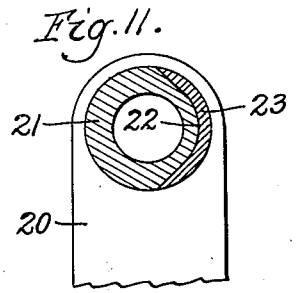
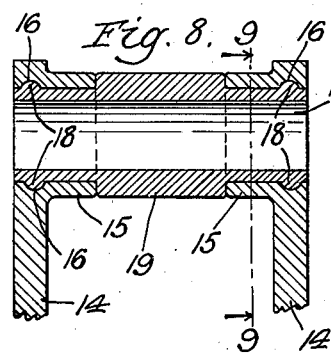
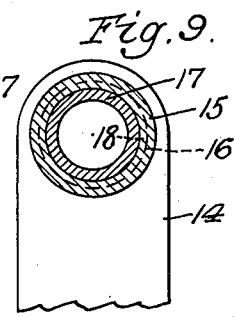
Inventors
Carl F. Lauenstein
Clarence J. Brinkworth
by Parker + Carter
Attorneys.

Patented Jan. 11, 1938

2,105,048

UNITED STATES PATENT OFFICE 2,105,048

COMPOSITE ARTICLE

Carl F. Lauenstein, and Clarence J. Brinkworth, Indianapolis, Ind., assignors to Link-Belt Company, Chicago, Ill., a corporation of Illinois Application June 28, 1935, Serial No. 28,865

2 Claims. (Cl. 148—3)

This invention relates to a composite article formed generally of a material not primarily abrasion resistant and including within the mass of the composite member parts of abrasion or wear resistant material.

One object of the invention is to form such a composite article and to prepare the abrasion resistant parts so that the composite article may be given an annealing or other heat treatment without in any appreciable amount reducing the abrasion resistance of the abrasion resistant member.

Another object is, therefore, first to prepare a metal part which can be submitted to an annealing or other comparable heat treating cycle without appreciable reduction in its abrasion or wear resistance so that it may be assembled in a composite unit and will retain substantially all of its abrasion or wear resistant qualities when the composite unit is as a whole given an annealing, malleableizing or other comparable heat treatment.

Other objects will appear from time to time in the specification and claims.

The invention is illustrated more or less diagrammatically in the accompanying drawing, wherein—

Figure 1 is a plan view of a composite chain link made according to the present invention;

Figure 2 is a longitudinal section taken along line 2—2 of Figure 1;

Figure 3 is a plan view of the insert;

Figure 4 is an end view of the same;

Figure 5 is a view generally similar to Figure 2, showing a modified form of insert;

Figure 6 is a view generally similar to Figure 4, showing the insert of Figure 5;

Figure 7 is an end view of the insert shown in Figures 5 and 6;

Figure 8 is a cross section illustrating a further modification in which two side bars of a chain of relatively softer material are joined to a central pintle or barrel of relatively harder and more abrasion resistant material;

Figure 9 is a transverse cross sectional view taken at line 9—9 of Figure 8;

Figure 10 is a longitudinal section showing a further modification;

Figure 11 is a transverse sectional view taken at line 11—11 of Figure 10.

Like parts are indicated by like characters throughout the specification and drawing.

As shown in Figure 1 there is illustrated a chain link having side bars 1, 1, joined by barrels 2, 2, which are preferably integral with the side bars. The barrels are hollow at 3, as shown, to receive pintle pins. Each barrel is provided with a depression or cut away portion 4. This portion receives the hard insert. A perforation or opening 5 is formed in the reduced portion 4 to receive a penetrating portion of the hard insert.

As illustrated generally in Figures 1 and 2 and specifically in Figures 3 and 4, the insert comprises a generally semi-cylindrical member 6 with an inwardly projecting boss 7. About its ends the member 6 is reduced to provide grooves 8. The boss 7 and the reduced end parts fuse readily with the mass of the link.

In manufacture the hard members are separately prepared and inserted in the mold after which the molten metal is poured around them and fusing to them in such a manner as to make for all practical purposes an integral unit. The shape of the insert is designed to assist the uniformity of the parts and the grooves 8 in particular permit the metal as it is cast to flow into them to form fillets 9 by means of which the insert is keyed into and additionally secured to the body of the link. After casting the composite unit is removed from the mold and is finished in any desired manner. A subsequent heat treatment which will be described below is given to the composite unit.

The form of the device shown in Figures 5 and 6 differs somewhat from that shown in the first four figures. The chain link has side bars 1, 1, which however, instead of being joined by barrels such as those shown in Figures 1 and 2, are jointed by generally semi-cylindrical portions 10 and the inserts, instead of being semi-cylindrical as in the earlier described forms, comprise cylindrical members 11, thickened or enlarged for approximately half of their diameter as at 12. At their ends the cylindrical portions 11 extend beyond the ends of the thickened or enlarged portion 12 to provide a groove into which the metal of the link as it is cast may flow and thus key the parts together by means of fillets 13.

In the form shown in Figures 8 and 9 the composite link is formed of side bars 14 having inwardly extending integral cylindrical bosses 15 which may be provided with annular grooves or depressions 16. The hard member comprises in this case the barrel 17 and is generally cylindrical as shown. It may be provided adjacent its outer ends with a raised annular portion 18 which fits into the grooves 16 in the side bars. In fact, since the member 17 is present in the mold when the side bars are cast, it is the elevated portion 18 which forms the groove 16 in the side bar, the metal flowing about the barrel and conforming to its shape. The parts are thus keyed together as the side bars are cast about the hard barrel. In order to give the barrel and the members 15 the same exterior diameter the barrel may be enlarged as at 19.

In the form shown in Figures 10 and 11, the hard inserts do not cover the entire working surface. In that form the chain link comprises side bars 20, joined by an integral barrel 21 in which a series of depressions 22 may be formed and within these depressions 22 are positioned curved hard members 23. These members as shown particularly in Figure 11 may be described as being of generally lunar shape. As in the case of the forms of the invention described above, the hard inserts 23 may be positioned in the mold when the remainder of the link is cast or the link may be cast without them and they may be welded into place.

The several forms of the invention have in common at least one important feature. Each of them comprises a body of metal which at some stage in the manufacture is subjected to an annealing, malleableizing or other heat treating cycle and each of them has formed as a part of it, or secured to it, by casting, welding or otherwise, a hard member of such nature that the annealing, malleableizing or other heat treating cycle to which the composite unit is subjected, does not materially affect or alter the physical properties of the hard member as a result of the heating. Thus the composite unit may be given for example, a malleableizing treatment and the hard part or parts will be substantially or wholly unaffected by that treatment while the rest of the unit will be malleableized. The complete process of the invention, therefore, contemplates the following steps:

(1) The formation of a hard part which will not be affected by the malleableizing cycle;

(2) The subsequent incorporation of that hard part with other metal parts which are to be malleableized;

(3) The malleableization or annealing of the composite unit which effects (a) The annealing or malleableization of the softer portion of the member and (b) Leaves the hard part substantially or wholly unaffected and unchanged.

While the invention is not limited to the use of any particular hard member nor to any particular means or process for producing it, it is convenient to make the hard member of an alloy white iron.

An average chemical analysis of commercial white cast iron is as follows:

| | Per cent |
|---|---|
| Carbon | 2.35 |
| Silicon | .95 |
| Manganese | .30 |
| Sulphur | .06 |
| Phosphorus | .16 |

While the analysis above given is an average analysis, of white cast iron, and while the analysis of white cast iron may vary considerably, in a general way white cast iron has a composition within the limits .5% to 2.0% silicon; .18% to .70% manganese; 1.5% to 3.5% carbon; .05% to .3% phosphorus; up to about .2% sulphur and the balance iron.

A material for use in the present invention has basically an analysis typical of white cast iron, but has alloying materials in addition. For example, it may contain one or more of the metals below listed:

| | Per cent |
|---|---|
| Chromium | .5 to 4.0 |
| Manganese | .50 to 6.00 |
| Molybdenum | .30 to 4.00 |
| Vanadium | .20 to 3.00 |

While carbon is normally present in the analysis of white cast iron, for certain purposes the alloy of the present invention has added to it carbon above that normally present in the metal in quantities varying from .05 per cent to 1.5 per cent, so that carbon, in additional quantities, when added to that normally present in the iron, is to be considered as an alloying substance in addition to the four above listed, and the alloy of the present invention thus comprises a metal having an analysis basically that of white cast iron to which has been added an additional quantity of carbon with or without a suitable quantity of chromium, manganese, molybdenum or vanadium, or suitable quantities of any number of these alloying substances.

One manner of producing the metal is to melt the iron in the usual way, in an air furnace, cupola, electric furnace or any other suitable furnace, the charge consisting of sprue, pig iron and scrap, according to the usual well known methods of producing such material. After it has been melted and refined to the point where it is ready for pouring the desired alloy or alloys, generally in the form of ferro chromium, ferro manganese, ferro molybdenum or ferro vanadium, are added and the iron is poured into the molds. If carbon is to be added above that normally present in the metal, while it may be added in any suitable form, for most purposes it is convenient to add it as coke. The alloying material, instead of being added to the melted metal may, where it is desirable, be charged into the melting furnace with the other elements of the charge.

As one example of an alloying material chromium may be added, usually in quantities from .5% to 4.0% and further carbon may be added in addition to that already present in the metal in quantities from .05% to 1.5%. Generally if chromium is to be added it is added in the form of ferro chromium within the proportions indicated.

An alloy suitable for use with this invention and containing 1.5% chromium and 2.70% carbon, but with an analysis otherwise substantially that outlined above, will have an increased Brinell hardness of from 420 to 470. It is thus harder than ordinary white cast iron and its abrasion resistant qualities are substantially increased. For certain purposes this alloy, without further treatment, is usable since it is distinctly superior both in hardness and in abrasion resistant qualities to ordinary white cast iron.

Where it is desired to increase the abrasion resistant qualities above that just indicated in the untreated metal, a special heat treatment is given. This heat treatment in general includes the heating of alloy white cast iron to a point above the critical temperature and then quenching it.

A typical heat treatment of the alloy metal includes the following steps:

(1) The alloy iron is heated to a temperature between 1450° and 1650° F., preferably to approximately 1550°;

(2) The metal is held at this temperature for about one-half hour;

(3) It is then quenched in oil.

After the heat treatment just outlined the hardness of the metal is between 750 and 800 Brinell. Should it be desired to reduce the brittleness and strains of the quenched material, the metal may then be drawn.

A microscopic study of the metal shows that after the heat treatment the material consists largely of grains of martensite embedded in cementite. It is very hard and is less brittle than the original white iron before treatment.

The cementite of the alloyed metal without the heat treatment, due to the alloy content, is harder than the cementite of ordinary white iron. Chemically cementite is $Fe_3C$, or iron carbide. In the alloyed metal of this invention the chromium forms with the iron and carbon a double carbide of iron and chromium which is harder than the ordinary unalloyed iron carbide.

Also, due to the fact that the carbon in the iron has been increased by the addition of coke or some other source, there is present in the body of metal more carbon available for carbide or cementite formation, and there is thus a larger amount of cementite or hard constituent present in the metal than is ordinarily present in white cast iron.

In the alloy just described above, before heat treatment, the pearlite or sorbitic pearlite is substantially the same as that of ordinary white iron except that it contains a portion of the alloying element. As a result of the heat treatment at temperatures above the critical temperature, and the quenching, this pearlite is transformed to martensite which is the hardest form of iron carbide, and because of the chromium present in the alloy this martensite is harder than the typical or unalloyed martensite.

The material resulting from the alloying and the heat treatment consists of alloy cementite and alloy martensite, both harder than unalloyed cementite and unalloyed martensite, and the relative amount of the cementite area with respect to that normally present in white cast iron has been increased by increasing the carbon content. The result is an extremely hard and wear resistant metal.

The properties of this metal are such that the usual annealing cycle applied to white iron to graphitize it and to form malleable iron does not affect it, and thus in the cast form this alloyed and heat treated metal will not be annealed if passed through the normal malleableizing cycle and a prolonged heating, followed by a slow cooling, does not materially alter the relative proportions or physical properties of the constituents. This feature is of advantage because it makes possible the use of inserts of the hard material of the present invention in chain links and other parts otherwise made of ordinary white cast iron.

Thus the composite units of the present invention may be made with wearing parts of the metal just described, or other parts of cast iron and the composite unit is subjected to an annealing or malleableizing treatment and after this treatment the white cast iron parts are found to be properly malleableized while the harder inserts are to all intents and purposes unchanged in their chemical composition and in their physical properties and this composite unit, after the malleableizing cycle, may be given other suitable heat treatments which will further harden and increase the wear resistant properties of the hard insert made according to the analysis and the process of the present invention.

The alloying substances above set out, which are added to the white cast iron to produce the metal of the present invention, have an important property in common, namely, that when alloyed with iron they form carbides and for that reason they may be referred to as of "the carbide forming group of alloys". When alloyed with iron it is found that each of them forms an iron carbide and whether or not it is present elsewhere in the mass of metal, it is present in combination with carbon and in combination with the iron carbide within the metal.

While a series of suitable analyses for the hard member have been described and while a possible heat treatment has been described, to which it may or may not be subjected before being inserted in the composite unit, and while these are suitable and have proved effective in practice, the invention is not to be limited to them, either to the analysis or to the heat treatment of the hard insert and other hard inserts might be used so long as they can be passed through the annealing or malleableizing cycle without substantial changes which would reduce their hardness or reduce their abrasion resistant qualities to the degree sufficient to destroy their usefulness in the composite unit described herewith.

In most forms of the device the insert is provided with one or more portions of reduced section. In one form, as shown in Figures 3 and 4, the projection 7 and the reduced ends produced by the grooves 8 are of such reduced section that the molten metal running around them when the link is cast will cause them to heat up rapidly and fuse with the molten metal to form a fused or welded joint between the casting frame and the alloy insert and the insert is thus held in place not only by the overlapping fillet portion 9, which flows in the groove 8, but additionally by the actual fusing of the parts.

In the form of the invention shown in Figure 7 the exterior of the thin section 11 fuses with the link as the latter is cast about the insert. The same action also takes place in the form shown in Figures 10 and 11 in which the thin ends of inserts 23 fuse with the link as the latter is cast.

In the form of the invention shown in Figures 8 and 9 as the locking rib 18 keys with the link, as the latter is cast, in all probability fusing of the reduced portion 17 also takes place.

While the invention is illustrated in one form and several chain links, it is not limited in its application to the form of chain link shown. It may be embodied in any type of chain link.

It is to be understood that after the composite article has been heated through an annealing cycle so that those parts of the composite article which are malleableizable have become malleableized, the composite article may thereafter be given further heat treatment if desired, and this heat treatment will ordinarily include the following steps:

a. Heating the composite article to a temperature within the range of 1450° F. to 1550° F.
   b. Holding it at that temperature to obtain uniformity through the entire mass of the composite article.
   c. Quenching in oil or otherwise.
   d. Reheating to a temperature between 1000° F. and 1300° F.
   e. Quenching in water or otherwise.

This subsequent heat treating after the malleableizing of the composite article improves the physical properties of the metal, and may be utilized where the simple or more typical malleableizing cycle is not sufficient to produce the desired physical properties in the composite article.

We claim:

1. The process of forming a composite chain link which includes the following steps: forming a relatively hard ferrous part, forming a mold for the composite link, placing said hard member in the mold, said hard member being shaped to key into the remainder of the link and to form a surface portion when cast, pouring molten metal into the mold about the hard member, causing it to flow into the keyed portion and to engage the hard member, causing the composite link to cool, removing it from the mold and subsequently heating the composite link through a malleableizing cycle and malleableizing all of the link except the hardened portions, such hardened portions having such analysis that they are substantially unaffected when subjected to a normal malleableizing cycle.

2. The process of forming a composite chain link which includes the following steps: forming a relatively hard ferrous metal link part, forming a mold for the composite link, placing said hard link part in the mold, said hard part being shaped to form a surface portion of the composite link when cast, pouring molten metal into the mold about the hard link part, causing said molten metal to flow about portions of the hard part and to form with it a composite link, causing the composite link to cool, removing it from the mold and subsequently heating the composite link through a malleableizing cycle and malleableizing all of the link except the hard part, such hard part having such analysis that it is substantially unaffected when subjected to a normal malleableizing cycle.

CARL F. LAUENSTEIN.
CLARENCE J. BRINKWORTH.